US011518853B2

(12) United States Patent
Yu et al.

(10) Patent No.: US 11,518,853 B2
(45) Date of Patent: *Dec. 6, 2022

(54) POLYAMIDE-IMIDE RESIN FILM

(71) Applicant: LG CHEM, LTD., Seoul (KR)

(72) Inventors: Yunah Yu, Daejeon (KR); Hyungsam Choi, Daejeon (KR); Byungguk Kim, Daejeon (KR); Youngsik Eom, Daejeon (KR); Sungyeol Choi, Daejeon (KR); Sanggon Kim, Daejeon (KR); Duk Hun Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 301 days.

This patent is subject to a terminal disclaimer.

(21) Appl. No.: 16/630,348

(22) PCT Filed: Dec. 7, 2018

(86) PCT No.: PCT/KR2018/015471
§ 371 (c)(1),
(2) Date: Jan. 10, 2020

(87) PCT Pub. No.: WO2019/139258
PCT Pub. Date: Jul. 18, 2019

(65) Prior Publication Data
US 2020/0157283 A1    May 21, 2020

(30) Foreign Application Priority Data
Jan. 11, 2018   (KR) .................. 10-2018-0004042

(51) Int. Cl.
*C08G 73/14* (2006.01)
*C08L 79/08* (2006.01)

(52) U.S. Cl.
CPC .............. *C08G 73/14* (2013.01); *C08L 79/08* (2013.01); *C08L 2201/08* (2013.01); *C08L 2203/16* (2013.01); *C08L 2203/20* (2013.01)

(58) Field of Classification Search
CPC .... C08G 73/14; C08G 73/10; C08G 73/1039; C08L 79/08; C08L 2201/08; C08L 2203/16; C08L 2203/20; C09D 179/08
See application file for complete search history.

(56) References Cited

U.S. PATENT DOCUMENTS

| | | | |
|---|---|---|---|
| 9,200,117 B2 | 12/2015 | Cho et al. | |
| 9,796,816 B2 | 10/2017 | Cho et al. | |
| 2012/0296050 A1 | 11/2012 | Cho et al. | |
| 2013/0203937 A1 | 8/2013 | Cho et al. | |
| 2014/0072813 A1* | 3/2014 | Fujii | H01L 29/78603 428/435 |
| 2015/0057426 A1 | 2/2015 | Cho et al. | |
| 2016/0039974 A1 | 2/2016 | Sun et al. | |
| 2016/0039977 A1 | 2/2016 | Cho et al. | |
| 2016/0222166 A1 | 8/2016 | Ahn et al. | |
| 2016/0319076 A1 | 11/2016 | Ju et al. | |
| 2017/0130004 A1 | 5/2017 | Choi et al. | |
| 2017/0145166 A1 | 5/2017 | Jeon et al. | |
| 2017/0218200 A1 | 8/2017 | Ahn et al. | |
| 2018/0002486 A1 | 1/2018 | Kim et al. | |
| 2019/0010291 A1 | 1/2019 | Choi et al. | |
| 2019/0217587 A1 | 7/2019 | Sawamoto et al. | |

FOREIGN PATENT DOCUMENTS

| | | |
|---|---|---|
| CN | 106967296 A | 7/2017 |
| JP | 2016-037604 A | 3/2016 |
| KR | 10-2013-0029129 A | 3/2013 |
| KR | 10-2013-0071650 A | 7/2013 |
| KR | 10-2013-0091217 A | 8/2013 |
| KR | 10-2015-0024110 A | 3/2015 |
| KR | 10-1523730 B1 | 5/2015 |
| KR | 10-2015-0076114 A | 7/2015 |
| KR | 10-2016-0003606 A | 1/2016 |
| KR | 10-2016-0081829 A | 7/2016 |
| KR | 10-2016-0095910 A | 8/2016 |
| KR | 10-2017-0089585 A | 8/2017 |
| KR | 10-2018-0003436 A | 1/2018 |
| TW | 201739794 A | 11/2017 |
| WO | 2017-221783 A1 | 12/2017 |

OTHER PUBLICATIONS

US 9,163,118 B2, 10/2015, Cho et al. (withdrawn)
International Search Repose issued for International Application No. PCT/KR2018/015471 dated Mar. 18, 2019, 4 pages.

* cited by examiner

Primary Examiner — Robert S Jones, Jr.
(74) Attorney, Agent, or Firm — Rothwell, Figg, Ernst & Manbeck, P.C.

(57) ABSTRACT

There is provided a polyamide-imide resin film including a polyamide-imide block copolymer having a specific structure and having a predetermined retardation.

7 Claims, No Drawings

POLYAMIDE-IMIDE RESIN FILM

CROSS-REFERENCE TO RELATED APPLICATION(S)

This application is a 35 U.S.C. 371 National Phase Entry Application from PCT/KR2018/015471, filed on Dec. 7, 2018, which claims the benefit of filing date of Korean Patent Application No. 10-2018-0004042 filed with Korean Intellectual Property Office on Jan. 11, 2018, the entire contents of which are incorporated herein by reference.

TECHNICAL FIELD

The present invention relates to a polyamide-imide resin film.

BACKGROUND ART

The aromatic polyamide-imide resin is a polymer mostly having an amorphous structure, and exhibits excellent heat resistance, chemical resistance, electrical characteristics, and dimensional stability due to its rigid chain structure.

Such polyamide-imide resins are widely used as materials in electric/electronic, aerospace, aviation, and automobile industries.

However, despite its excellent heat resistance, the wholly aromatic polyamide-imide resin is mostly insoluble and infusible and thus molding and processability are deteriorated. Thus, there is a problem that it is difficult to use conventional processing equipment for resin processing.

Therefore, various attempts have been made to improve melt formability while minimizing the reduction in the heat resistance of the polyamide-imide resin and the mechanical properties at a high temperature. For example, in order to increase the chain flexibility in the polyamide-imide resin, a method of introducing an —O— group, an —S— group, or the like, and a method of introducing a meta substituent or a bulky molecular structure, and the like, has been proposed.

However, it is difficult for the polyimide resin according to the aforementioned proposals to exhibit sufficient heat resistance due to the bending structure or the aliphatic cyclic compound, and a film prepared using the same still has limitations such as poor mechanical properties.

Further, when the polyamide-imide resin is used as a flexible display material, it is required to have excellent optical properties in addition to thermal properties and mechanical properties, and there is a problem that it is difficult to satisfy these physical properties at a required level at the same time.

DETAILED DESCRIPTION OF THE INVENTION

The present invention provides a polyamide-imide resin film having excellent mechanical properties, high elasticity, and folding endurance while being colorless and transparent.

There is provided a polyamide-imide resin film including a polyamide-imide block copolymer containing a first repeating unit represented by the following Chemical Formula 1, a second repeating unit represented by the following Chemical Formula 2, and a third repeating unit represented by the following Chemical Formula 3, wherein a molar ratio of the second repeating unit to the third repeating unit is 10:90 to 50:50, and retardation (Rth) in the thickness direction measured at a wavelength of 400 nm to 800 nm is 8000 nm or less.

[Chemical Formula 1]

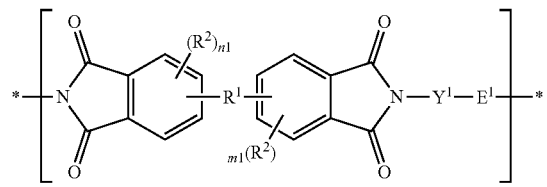

In Chemical Formula 1, each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O) NH—, or a divalent aromatic organic group having 6 to 30 carbon atoms;

each $R^2$ is the same as or different from each other in each repeating unit, and each is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms;

n1 and m1 are each independently an integer of 0 to 3;

each $Y^1$ is the same as or different from each other in each repeating unit, and each independently includes a divalent aromatic organic group having 6 to 30 carbon atoms including at least one trifluoromethyl group (—CF$_3$), the aromatic organic group exists alone, or two or more aromatic organic groups are bonded to each other to form a divalent condensed ring, or two or more aromatic organic groups are linked by a single bond, a fluorenylene group, —O—, —S—, —C(=O)—, —CH(OH)—, —S(=O)$_2$—, —Si (CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

and each $E^1$ is independently a single bond or —NH—.

[Chemical Formula 2]

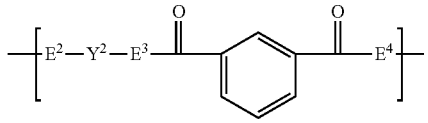

[Chemical Formula 3]

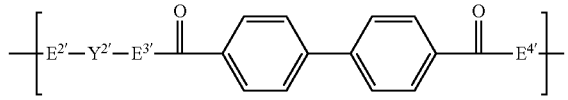

In Chemical Formulae 2 and 3, $Y^2$ and $Y^{2'}$ are the same as or different from each other in each repeating unit, and each is independently a divalent aromatic organic group having 6 to 30 carbon atoms and containing at least one trifluoromethyl group (—CF$_3$), the aromatic organic group exists alone, or two or more aromatic organic groups are bonded to each other to form a divalent condensed ring, or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—; and $E^2$, $E^{2'}$, $E^3$, $E^{3'}$, $E^4$, and $E^{4'}$ are each independently a single bond or —NH—.

Hereinafter, a polyamide-imide resin film according to an embodiment of the invention is described in more detail.

Unless otherwise specified throughout this specification, the technical terms used herein are only for describing specific embodiments and are not intended to limit the present invention.

The singular forms "a," and "an" are intended to include the plural forms as well, unless the context clearly indicates otherwise.

The term "including" or "comprising" used herein specifies a specific feature, region, integer, step, action, element, and/or component, but does not exclude the addition of a different specific feature, area, integer, step, action, element, component, and/or group.

The terms including ordinal numbers such as "first", "second", etc. are used only for the purpose of distinguishing one component from another component, and are not limited by ordinal numbers.

For instance, a first component may be referred to as a second component, or similarly, the second component may be referred to as the first component, without departing from the scope of the present invention.

According to an embodiment of the invention, a polyamide-imide resin film can be provided including a polyamide-imide block copolymer containing a first repeating unit represented by Chemical Formula 1, a second repeating unit represented by Chemical Formula 2, and a third repeating unit represented by Chemical Formula 3, wherein a molar ratio of the second repeating unit to the third repeating unit is 10:90 to 50:50, and wherein retardation (Rth) in the thickness direction measured at a wavelength of 400 nm to 800 nm is 8000 nm or less.

As a result of studies by the present inventors, it has been found through experiments that when the polyamide-imide block copolymer containing the second repeating unit to the third repeating unit in a specific amount is used, it is possible to provide a polyamide-imide resin film which is colorless and transparent and has excellent mechanical properties and a low birefringence index, thereby completing the present invention.

Specifically, as the polyamide-imide block copolymer contains the second repeating unit to the third repeating unit in a molar ratio of 10:90 to 50:50, it can have a polymer inner structure (feature) capable of improving elasticity while maintaining high mechanical properties, whereby it is possible to provide a film which is excellent in processability and facilitates formation of films, and which is colorless and transparent and has excellent mechanical properties.

The thickness of the polyamide-imide resin film is not particularly limited, but the polyamide-imide resin film may have a thickness of 10 to 100 μm, considering the optical properties, mechanical properties, birefringence, and the like of the film.

The polyamide-imide resin film may have a yellowness index of 10 or less, and exhibit haze of 2% or less.

The retardation (Rth) in the thickness direction measured at a wavelength of 400 nm to 800 nm with respect to the polyamide-imide resin film may be 8000 nm or less, 3000 to 8000 nm, or 4500 to 7500 nm.

As the polyamide-imide resin film has the retardation (Rth) in the thickness direction measured at a wavelength of 590 nm of 8,000 nm or less, it can have a low birefringence index and high mechanical properties.

More specifically, the retardation (Rth) in the thickness direction measured at a wavelength of 400 nm to 800 nm with respect to the polyamide-imide resin film may be 3000 to 8000 nm, or 4500 to 7500 nm, and the polyamide-imide resin film may be anisotropic.

The thickness-direction retardation (Rth) of the polyamide-imide resin film can be confirmed by a commonly known measurement method and measurement apparatus.

For example, the retardation (Rth) in the thickness direction can be determined using a measuring apparatus manufactured by AXOMETRICS, Inc. under the trade name of "AxoScan", and the like.

In addition, the retardation (Rth) in the thickness direction can be determined by: inputting a value of a refractive index (589 nm) of the polyamide-imide resin film into the measuring apparatus, then measuring the thickness-direction retardation of the polyamide-imide resin film by using light at a wavelength of 590 nm under conditions of a temperature of 25° C. and humidity of 40%; and converting the measured value of the thickness-direction retardation thus determined (the value is measured according to the automatic measurement (automatic calculation) of the measuring apparatus) into a retardation value per 10 μm of the thickness of the film.

In addition, the size of the polyimide film as the measurement sample is not particularly limited, as long as it is larger than a light measurement unit (diameter: about 1 cm) of a stage of the measuring apparatus. However, the size may be a length of 76 mm, a width of 52 mm, and a thickness of 13 μm.

The value of the "refractive index (589 nm) of the polyimide film" utilized in the measurement of the thickness-direction retardation (Rth) can be determined by: forming an unstretched film including the same kind of polyamide-imide resin film as the polyamide-imide resin film for forming the film to be measured for the retardation, and then measuring the unstretched film as a measurement sample (in the case where the film to be measured is an unstretched film, the film can be directly used as the measurement sample) for the refractive index for light at 589 nm in an in-plane direction (the direction perpendicular to the thickness direction) of the measurement sample by using a refractive index-measuring apparatus (manufactured by Atago Co., Ltd. under the trade name of "NAR-1T SOLID") as a measuring apparatus under a light source of 589 nm and a temperature condition of 23° C.

Further, when the measurement sample is unstretched, the refractive index in the in-plane direction of the film is the same in any direction in the plane, and measuring this refractive index makes it possible to measure the intrinsic refractive index of the polyamide-imide resin film (further, since the measurement sample is unstretched, Nx=Ny is satisfied, where Nx is a refractive index in a direction of a slow axis in the plane, and Ny is a refractive index in an in-plane direction perpendicular to the direction of the slow axis).

In this way, an unstretched film is utilized to measure the intrinsic refractive index (589 nm) of the polyamide-imide resin film, and the measurement value thus obtained is utilized in the measurement of the above-described thickness-direction retardation (Rth).

Here, the size of the polyamide-imide resin film as a measurement sample is not particularly limited, as long as the size can be utilized in the refractive index-measuring apparatus. The size may be 1 cm square (1 cm in length and width) and 13 μm in thickness.

On the other hand, the polyamide-imide resin film can be produced by stretching in the step of melting and extruding the polyamide-imide block copolymer at a predetermined temperature, for example, 100° C. or more.

Accordingly, the stretching ratio (or stretching magnification) in the transverse direction (TD direction) of the polyamide-imide resin film may be about 5%, 1% to 10%, or 3% to 8%.

The above-mentioned polyamide-imide block copolymer will be described in more detail.

As described above, in the preparation of the polyamide-imide copolymer, by introducing a specific structure into the amide-derived repeating unit, the thermal properties, mechanical properties, and optical properties of the copolymer can be simultaneously improved.

Specifically, by limiting a diacyl halide, a dicarboxylic acid, and a dicarboxylate compound to a specific structure, and by limiting their molar ratios, it was confirmed that while maintaining the mechanical properties and heat resistance of the polyamide-imide copolymer at an excellent level, the optical properties of the resin could also be improved.

In particular, it exhibits anisotropy and is easily applied to a flexible display or the like.

(i) Repeating Unit Derived from Imide: First Repeating Unit

[Chemical Formula 1]

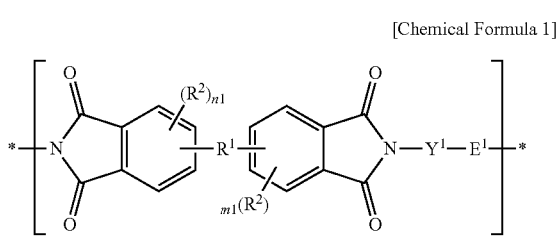

In Chemical Formula 1, each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a divalent aromatic organic group having 6 to 30 carbon atoms;

each $R^2$ is the same as or different from each other in each repeating unit, and each is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms;

n1 and m1 are each independently an integer of 0 to 3;

each $Y^1$ is the same as or different from each other in each repeating unit, and each independently includes a divalent aromatic organic group having 6 to 30 carbon atoms including at least one trifluoromethyl group (—CF$_3$), the aromatic organic group exists alone, or two or more aromatic organic groups are bonded to each other to form a divalent condensed ring, or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—; and each $E^1$ is independently a single bond or —NH—.

Here, the single bond means a case where $R^1$ in Chemical Formula 1 is a chemical bond that simply connects groups on both sides.

Further, each $R^2$ is the same as or different from each other in each repeating unit, and each may independently be —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms.

n1 and m1 may each independently be an integer of 0 to 3.

Each $Y^1$ may be the same as or different from each other in each repeating unit, and each may independently be an aliphatic organic group having 3 to 10 carbon atoms.

Each $E^1$ may independently be a single bond or —NH—.

Here, the single bond means a chemical bond that simply connects groups on both sides of each substituent in Chemical Formula 1.

Preferably, the first repeating unit may include a repeating unit represented by the following Chemical Formula 1-1.

[Chemical Formula 1-1]

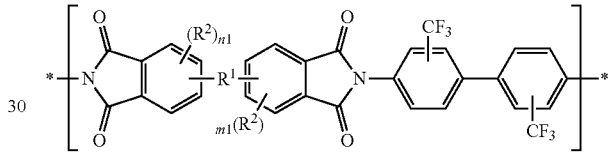

In Chemical Formula 1-1, $R^1$, $R^2$, n1, and m1 are as defined in Chemical Formula 1.

(ii) Repeating Unit Derived from Amide: Second Repeating Unit and Third Repeating Unit

[Chemical Formula 2]

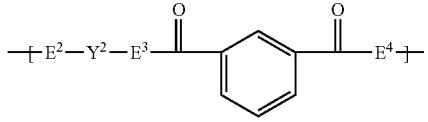

[Chemical Formula 3]

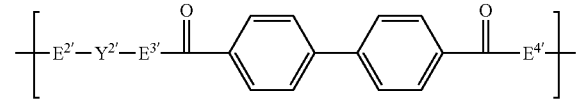

In Chemical Formulae 2 and 3, $Y^2$ and $Y^{2'}$ are the same as or different from each other in each repeating unit, and each is independently a divalent aromatic organic group having 6 to 30 carbon atoms and containing at least one trifluoromethyl group (—CF$_3$), the aromatic organic group exists alone, or two or more aromatic organic groups are bonded to each other to form a divalent condensed ring, or two or more aromatic organic groups are linked by a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—; and $E^2$, $E^{2'}$, $E^3$, $E^{3'}$, $E^4$, and $E^{4'}$ are each independently a single bond or —NH—.

The second repeating unit and the third repeating unit are repeating units derived from amide, and in Chemical Formulae 2 and 3, the divalent linking group in the form of —C(=O)-A-C(=O)— is derived from at least one compound selected from the group consisting of diacyl halide, dicarboxylic acid, and dicarboxylate.

In the second repeating unit, two —C(=O)— are positioned at a meta position with respect to A

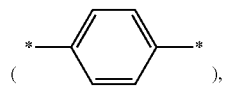

and in the third repeating unit, two —C(=O)— are positioned at a para position with respect to A

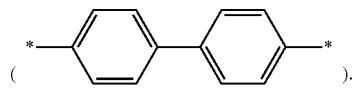

Preferably, the second repeating unit may include a repeating unit represented by the following Chemical Formula 2-1.

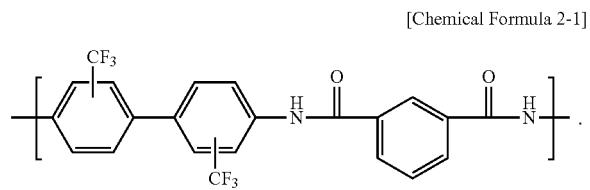

[Chemical Formula 2-1]

Preferably, the third repeating unit may include a repeating unit represented by the following Chemical Formula 3-1.

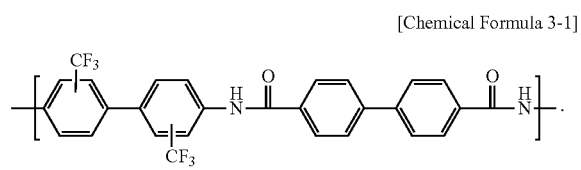

[Chemical Formula 3-1]

Meanwhile, in the polyamide-imide block copolymer described above, the molar ratio of the second repeating unit and the third repeating unit is 10:90 to 50:50, and by satisfying the above molar ratio, it is possible to simultaneously improve the thermal properties, mechanical properties, and optical properties of the copolymer.

When the molar ratio of the second repeating unit and the third repeating unit is out of the above-mentioned range, there may be a problem that haze increases or yellowing occurs.

More specifically, in the polyamide-imide block copolymer, preferably, the molar ratio of the first repeating unit derived from imide to the total sum of the second repeating unit and the third repeating unit derived from amide may be 5:5 to 2:8 (1:1 to 1:4), 4.5:5.5 to 3:7 (about 1:1.22 to 1:2.33), or 4:6 to 3:7.

By simultaneously satisfying the molar ratio of the second repeating unit and the third repeating unit, the mechanical properties, thermal properties, and optical properties of the polyamide-imide resin film can be improved to a high level.

Further, in the polyamide-imide block copolymer, when the molar ratio between the first repeating unit to the total sum of the second repeating unit to the third repeating unit is 3:7 to 4:6, the molar ratio of the second repeating unit to the third repeating unit may be 20:80 to 50:50 or 30:70 to 45:55, and more preferably about 40:60.

When simultaneously satisfying the above range, the mechanical properties, thermal properties, and optical properties of the polyamide-imide resin film can be improved to a high level.

Further, in the above polyamide-imide block copolymer, when the molar ratio of the first repeating unit to the total sum of the second repeating unit and the third repeating unit is 4.5:5.5 to 4:6, the molar ratio of the second repeating unit to the third repeating unit may be 20:80 to 40:60.

When simultaneously satisfying the above range, the mechanical properties, thermal properties, and optical properties of the polyamide-imide resin film can be improved at a high level.

Meanwhile, the polyamide-imide block copolymer may further include, in addition to the first repeating unit, the second repeating unit, and the third repeating unit, a fourth repeating unit represented by the following Chemical Formula 4.

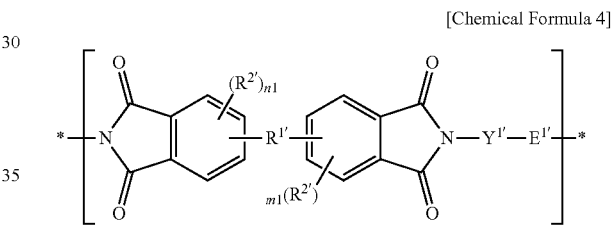

[Chemical Formula 4]

In Chemical Formula 4, each $R^{1'}$ is the same as or different from each other in each repeating unit, and each independently includes a divalent aromatic organic group having 6 to 30 carbon atoms, the aromatic organic group exists alone, or two or more aromatic organic groups are bonded to each other to form a divalent condensed ring, or two or more aromatic organic groups may be linked by a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(O)NH—;

each $R^{2'}$ is the same as or different from each other in each repeating unit, and may each independently be —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms;

n3 and m3 may each independently be an integer of 0 to 3;

each $Y^{1'}$ is the same as or different from each other in each repeating unit, and each is independently a divalent aromatic organic group having 6 to 30 carbon atoms and containing at least one trifluoromethyl group (—CF$_3$), the aromatic organic group exists alone, or two or more aromatic organic groups may be bonded to each other to form a divalent condensed ring, or two or more aromatic organic groups may be linked by a single bond, a fluorenylene group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—; and each E$^{1'}$ may independently be a single bond or —NH—.

As described above, in the polyamide-imide block copolymer including all of the first repeating unit, the second repeating unit, and the third repeating unit, by satisfying the molar ratio of the second repeating unit and the third repeating unit, and the molar ratio of the first repeating unit derived from an imide, the second repeating unit and the third repeating unit derived from an amide unit within a specific range, it is possible to simultaneously improve the mechanical properties, thermal properties, and optical properties of the copolymer.

The polyamide-imide block copolymer may have a weight average molecular weight of 10,000 to 1,000,000 g/mol, preferably 15,000 to 800,000 g/mol.

On the other hand, the polyamide-imide block copolymer may be provided by a preparation method including a step of mixing a compound forming the first repeating unit in an appropriate solvent to initiate the reaction; a step of adding a compound forming the second repeating unit to the reaction mixture of said step to cause a reaction; a step of adding a compound forming the third repeating unit to the reaction mixture of said step to cause a reaction; and a step of adding a compound such as acetic anhydride or pyridine to the reaction mixture of said step to induce a chemical imidization reaction, or to induce a thermal imidization of amic acid by azeotropic distillation.

In addition, when the polyamide-imide block copolymer further includes the fourth repeating unit, it may be provided by a preparation method including a step of mixing a compound forming the first repeating unit in an appropriate solvent to initiate a reaction; a step of adding a compound forming the second repeating unit to the reaction mixture of said step to cause a reaction; a step of adding a compound forming the third repeating unit to the reaction mixture of said step to cause a reaction; a step of adding a compound forming the fourth repeating unit to the reaction mixture of said step to cause a reaction; and a step of adding a compound such as acetic anhydride or pyridine to the reaction mixture of said step to induce a chemical imidization reaction, or to induce thermal imidization of amic acid by azeotropic Distillation.

Further, as is generally known, low temperature solution polymerization, interfacial polymerization, melt polymerization, solid phase polymerization, and the like can be used for the production of the polyamide-imide block copolymer.

Meanwhile, the polyamide-imide resin film of the embodiment can be produced by a conventional method such as a dry method or a wet method using the polyamide-imide block copolymer.

For example, the polyimide-based film may be obtained by coating a solution containing the copolymer on an arbitrary support to form a film, and then evaporating the solvent from the film to dry it.

If necessary, stretching and heat treating of the polyimide-based film may be carried out.

As described above, the polyamide-imide resin film can be produced by heat treating the aforementioned polyamide-imide block copolymer at a predetermined temperature, for example, at a temperature of 100° C. or more, to prepare a film and then stretching it.

Specific methods and conditions of the stretching and the apparatus to be used are not particularly limited.

For example, after subjecting the polyamide-imide block copolymer to a primary heat treatment at a temperature of 150 to 280° C., stretching can be carried out at a predetermined stretching ratio (for example, a stretching ratio of about 5%) at a temperature of 150 to 280° C. by applying a rate of about 0.1%/s to provide a stretched polyamide-imide resin film.

The stretching ratio (or stretching magnification) in the transverse direction (TD direction) of the polyamide-imide resin film may be about 5%, 1% to 10%, or 3% to 8%.

Advantageous Effects

According to the present invention, a polyamide-imide resin film having excellent mechanical properties, high elasticity, and folding endurance while being colorless and transparent can be provided. Such a polyamide-imide resin film can be applied to substrates for displays, protective films for displays, touch panels, and cover films for flexible or foldable devices due to the above-described properties.

DETAILED DESCRIPTION OF THE EMBODIMENTS

Hereinafter, preferred examples are presented to facilitate understanding of the present invention. However, the following examples are given for illustrative purposes only, and the scope of the present invention is not intended to be limited to or by these examples.

Examples 1 to 5 and Comparative Example 1: Preparation of Polyamide-Imide Copolymer Example 1

2,2'-bis(trifluoromethyl)benzidine, 4,4'-(hexafluoroisopropylidene)diphthalic anhydride, and dimethylacetamide were placed in a 500 mL round flask (reactor) equipped with a Dean-Stark apparatus and a condenser, and the reaction was initiated at room temperature. The reaction mixture was stirred in an ice bath at 0° C. for 4 hours under a nitrogen atmosphere.

After 4 hours, the reaction product was taken out and raised to room temperature, and 2,2'-bis(trifluoromethyl) benzidine, isophthaloyl dichloride (IPC), 4,4'-biphenyldicarbonyl chloride (BPC), and dimethylacetamide were added thereto, and the reaction was initiated at room temperature (25° C.±3° C.) under a nitrogen atmosphere.

After the formation of a polyamic acid polymer by the reaction for 4 hours, acetic anhydride and pyridine were added to the reaction mixture, and the mixture was stirred in an oil bath at 40° C. for 15 hours to carry out a chemical imidization reaction.

After completion of the reaction, the reaction product was precipitated with water and ethanol (1:1 (v/v)) to obtain a polyimide-imide block copolymer A-1 having a first repeating unit, a second repeating unit, and a third repeating unit of the following structure (weight average molecular weight: about 200,000 g/mol).

The obtained copolymer had a molar ratio (①) of the first repeating unit to the total sum of the second repeating unit and third repeating unit of 50:50, and a molar ratio (②) of the second repeating unit to the third repeating unit of 20:80.

[First Repeating Unit]—Imide Repeating Unit

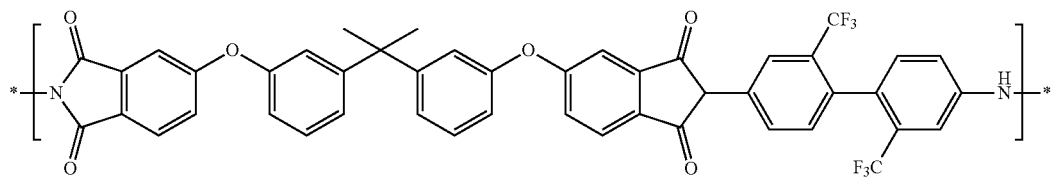

[Second Repeating Unit]—Amide Repeating Unit (Derived from IPC)

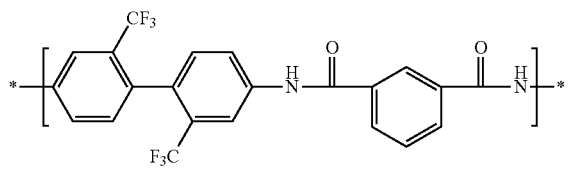

[Third Repeating Unit]—Amide Repeating Unit (Derived from BPC)

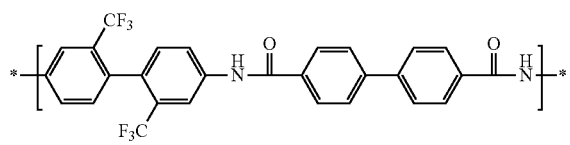

Examples 2 to 5

A polyamide-imide copolymer was prepared by adjusting the addition ratios of the respective monomers so as to satisfy the molar ratios (① and ②) described in the following Table 1 in Example 1.

Comparative Example 1

A copolymer including the following 2-2 repeating unit instead of the second repeating unit was prepared by using terephthaloyl dichloride (TPC) instead of isophthaloyl dichloride in Example 5.

In the case of such copolymer, gelation occurred, and thus the weight average molecular weight was not confirmed.

[2-2 Repeating Unit]—Amide Repeating Unit (Derived from TPC)

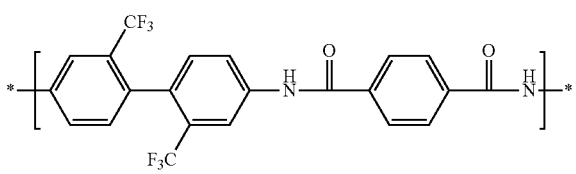

The compositions of the monomers used in Examples 1 to 5 and Comparative Example 1 and the weight average molecular weights of the produced copolymers are shown in Table 1 below.

TABLE 1

| Category | Imide:Amide -① | Amide repeating unit ratio - ② kind | ratio | Weight average molecular weight of copolymer |
|---|---|---|---|---|
| Example 1 | 50:50 | IPC:BPC | 20:80 | 520,000 |
| Example 2 | 50:50 | IPC:BPC | 30:70 | 490,000 |
| Example 3 | 40:60 | IPC:BPC | 20:80 | 420,000 |
| Example 4 | 40:60 | IPC:BPC | 30:70 | 360,000 |
| Example 5 | 40:60 | IPC:BPC | 40:60 | 270,000 |
| Comparative Example 1 | 40:60 | BPC:TPC | 40:60 | Gelation |

* Imide: Amide ① represents a molar ratio of the first repeating unit to the total sum of the second repeating unit and the third repeating unit.
* Amide repeating unit ratio ② represents a molar ratio of the second repeating unit (or the 2-2 repeating unit) to the third repeating unit (or the 2-2 repeating unit).

Examples 6 to 9 and Reference Example 1

The polyamide-imide copolymer obtained in Example 5 was dissolved in dimethylacetamide to prepare an approximate 10 wt % solution.

The solution was casted on a glass plate through a bar coater. At this time, the drying temperature was controlled sequentially to 80° C. and then 140° C.

As a result, polyamide-imide films of the examples and comparative examples having a thickness of 50 μm were prepared.

After the polyamide-imide film was subjected to the primary heat treatment at the temperature and time described in Table 2 below, and the stretching was carried out by applying the stretching temperature, stretching speed, and stretching ratio shown in Table 2 below, annealing was carried out to provide a stretched polyamide-imide resin film (Examples 6 to 9/Reference Example 1 was not subjected to primary heat treatment and stretching).

TABLE 2

| Category | Primary heat treatment temperature/time | Stretching temperature | Stretching ratio (MD*TD) | Stretching speed | Conditions for annealing in nitrogen gas |
|---|---|---|---|---|---|
| Example 6 | 175° C./60 s | 175° C. | 1.05*1.05 | 0.1%/s | |
| Example 7 | 200/60 s | 200 | 1.05*1.05 | 0.1%/s | 250° C./60 s |
| Example 8 | 200/60 s | 200 | 1.05*1.05 | 0.1%/s | 250° C./60 s |
| Example 9 | 250/60 s | 250 | 1.05*1.05 | 0.1%/s | 250° C./60 s |
| Reference Example 1 | | | | | |

Experimental Example

The physical properties of the polymer films prepared in the examples and comparative examples were evaluated by the following methods, and the results are shown in Table 2 below.

1. Mechanical Properties

The elastic modulus (EM, GPa), the ultimate tensile strength (TS, MPa), and the tensile elongation (TE, %) of a film having a thickness of 30±2 μm were measured according to ASTM D 882 using a universal testing machine.

2. Retardation (Rth) in Thickness Direction

The retardation (Rth) in the thickness direction was determined by directly using the polymer film (a length of 76 mm, a width of 52 mm, and a thickness of 13 μm) prepared in each of the examples and comparative examples as a measuring sample, using a measuring apparatus manufactured by AXOMETRICS, Inc. under the trade name of "AxoScan", inputting a value of a refractive index (the refractive index at a wavelength of 589 nm of the film obtained by the measurement of the refractive index described above) of each polymer film into the measuring apparatus, measuring the thickness-direction retardation by using light at a wavelength of 590 nm under conditions of a temperature of 25° C. and humidity of 40%; and then converting the measured value of the thickness-direction retardation thus obtained (the value was measured according to the automatic measurement of the measuring apparatus) into a retardation value per 10 μm of the thickness of the film.

3. Measurement of Folding Endurance (MIT)

The folding endurance was measured using an MIT Folding Endurance Tester (manufactured by Cometech).

Specifically, the produced film was cut into test pieces of a width 1 cm×length 7 cm and then repeatedly bent at an angle of 135° according to ISO 5626, a radius of curvature of 0.8 mm, a load of 250 g, and a speed of 175 rpm, and the number of cycles required for breakage was measured.

The measurement was performed by dividing each of the TD direction in which stretching was performed and the MD direction in which stretching was not performed.

TABLE 3

| Category | Elastic modulus (GPa) | Tensile strength (MPa) | Tensile elongation (%) | Folding endurance (cycle) | Thickness-direction retardation (Rth) |
|---|---|---|---|---|---|
| Example 6 | 4.26 | 161.76 | 23.83 | 4227 | 4771 |
| Example 7 | 4.08 | 145.91 | 26.91 | 5627 | 5093 |
| Example 8 | 4.41 | 156.58 | 23.59 | 6783 | 5100 |
| Example 9 | 4.70 | 172.77 | 16.41 | 7500 | 6517 |
| Reference Example 1 | 4.58 | 167.76 | 15.33 | 2274 | 4065 |

It was confirmed that the polyamide-imide resin films obtained in Examples 6 to 9 had a low yellowness index and haze and thus had colorless and transparent appearance characteristics, and further had excellent mechanical properties, particularly significantly improved folding endurance, while having a feature that the retardation (Rth) in the thickness direction measured at 400 nm to 800 nm was 4500 to 7500 nm as can be seen from Table 3.

The invention claimed is:

1. A polyamide-imide resin film comprising a polyamide-imide block copolymer containing a first repeating unit represented by Chemical Formula 1, a second repeating unit represented by Chemical Formula 2, and a third repeating unit represented by Chemical Formula 3,
    wherein a molar ratio of the second repeating unit to the third repeating unit is 40:60 to 45:55,
    wherein a molar ratio between the first repeating unit the total sum of the second repeating unit and the third repeating unit is 3:7 to 4:6,
    wherein the polyamide-imide block copolymer has a weight average molecular weight of 10,000 to 1,000,000 g/mol, and
    wherein retardation (Rth) in the thickness direction with respect to the polyamide-imide resin film, as measured at a wavelength of 400 nm to 800 nm is 8000 nm or less:

[Chemical Formula 1]

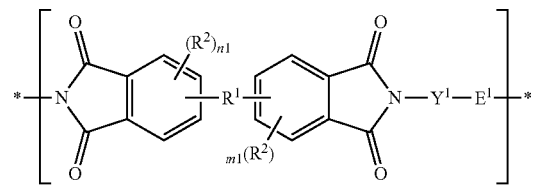

wherein, in the Chemical Formula 1,
each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a divalent aromatic organic group having 6 to 30 carbon atoms;
each $R^2$ is the same as or different from each other in each repeating unit, and each is independently —H, —F, —Cl, —Br, —I, —CF$_3$, —CCl$_3$, —CBr$_3$, —Cl$_3$, —NO$_2$, —CN, —COCH$_3$, —CO$_2$CH$_2$C$_2$H5, a silyl group having three aliphatic organic groups having 1 to 10 carbon atoms, an aliphatic organic group having 1 to 10 carbon atoms, or an aromatic organic group having 6 to 20 carbon atoms;

n1 and m1 are each independently n integer of 0 to 3;

each $Y^1$ is the same as or different from each other in each repeating unit, and each independently includes a divalent aromatic organic group having 6 to 30 carbon atoms including at least one trifluoromethyl group ($-CF_3$) the aromatic organic group exists alone, or two or more aromatic organic groups are bonded to each other to form a divalent condensed ring, or two or more aromatic organic groups are linked by a single bond, a fluorenylene group, $-O-$, $-S-$, $-C(=O)-$, $-CH(OH)-$, $-S(=O)_2-$, $-Si(CH_3)_2-$, $-(CH_2)_p-$ (wherein $1 \le p \le 10$), $-(CF_2)_q-$ (wherein $1 \le q \le 10$), $-C(CH_3)_2-$, $-C(CF_3)_2-$, or $-C(=O)NH-$; and each $E^1$ is independently a single bond or $-NH-$,

[Chemical Formula 2]

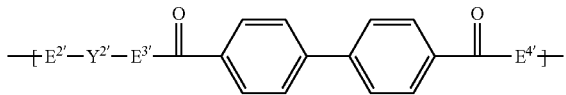

[Chemical Formula 3]

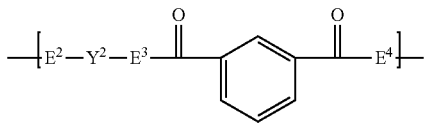

wherein, in the Chemical Formulae 2 and 3, $Y^2$ and $Y^{2\prime}$ are the same as or different from each other in each repeating unit, and each is independently a divalent aromatic organic group having 6 to 30 carbon atoms and containing at least one trifluoromethyl group ($-CF_3$), the aromatic organic group exists alone, or two or more aromatic organic groups are bonded to each other to form a divalent condensed ring, or two or more aromatic organic groups are linked by a single bond, a fluorenylene group, $-O-$, $-S-$, $-C(=O)-$, $-CH(OH)-$, $-S(=O)_2-$, $-Si(CH_3)_2-$, $-(CH_2)_p-$ (wherein $1 \le p \le 10$), $-(CF_2)_q-$ (wherein $1 \le q \le 10$), $-C(CH_3)_2-$, $-C(CF_3)_2-$, or $-C(=O)NH-$; and $E^2$, $E^{2\prime}$, $E^3$, $E^{3\prime}$, $E^4$, and $E^{4\prime}$ are each independently a single bond or $-NH-$.

2. The polyamide-imide resin film according to claim 1, wherein the retardation (Rth) in the thickness direction with respect to the polyamide-imide resin film, as measured at a wavelength of 400 nm to 800 nm is 4500 to 7500 nm, and the polyamide-imide resin film is anisotropic.

3. The polyimide-imide resin film according to claim 1, wherein the first repeating unit includes a repeating unit represented by Chemical Formula 1-1:

[Chemical Formula 1-1]

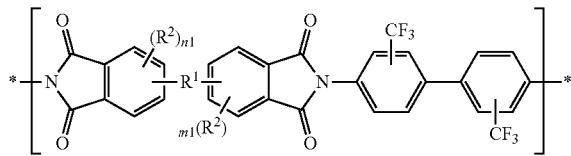

wherein, in Chemical Formula. 1-1, $R^1$, $R^2$, n1, and m1 are as defined in Chemical Formula 1.

4. The polyamide-imide resin film according to claim 1, wherein the second repeating unit includes a repeating unit represented by Chemical Formula 2-1:

[Chemical Formula 2-1]

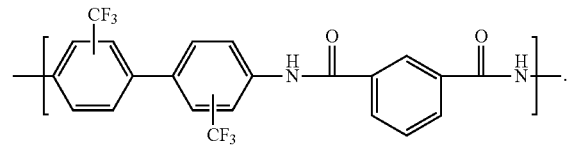

5. The polyimide-imide resin film according to claim 1, wherein the third repeating unit includes a repeating unit represented ley Chemical Formula 3-1:

[Chemical Formula 3-1]

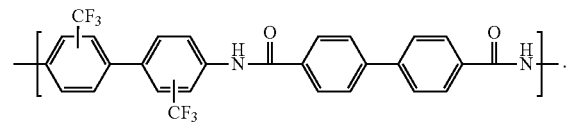

6. The polyamide-imide resin film according to claim 1, wherein the polyamide-imide: resin film has a thickness of 10 to 100 μm.

7. The polyamide-imide resin film according to claim 1, wherein a stretching ratio in the transverse direction (TD direction) of the polyamide-imide resin film is 1% to 10%.

\* \* \* \* \*